United States Patent Office 3,649,695
Patented Mar. 14, 1972

3,649,695
BENZOPHENONE SULFOXIDE AND SULFONE UV ABSORBERS
Jerry Peter Milionis, Somerset, N.J., assignor to American Cyanamid Company, Stamford, Conn.
No Drawing. Filed Aug. 6, 1969, Ser. No. 848,099
Int. Cl. C07c 49/82
U.S. Cl. 260—591                 3 Claims

ABSTRACT OF THE DISCLOSURE

Sulfinyl and sulfonyl bis(2-hydroxybenzophenones) are provided having the general formula:

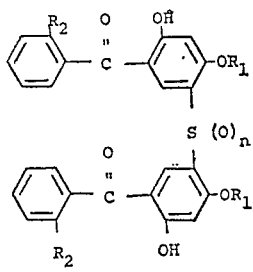

wherein $R_1$ is hydrogen or alkyl having from 1 to 8 carbon atoms or aralkyl having from 7 to 18 carbon atoms; $R_2$ is hydrogen or alkyl having from 1 to 8 carbon atoms; and $n$ is an integer from 1 to 2, inclusive.

---

The sulfinyl bis(2-hydroxybenzophenones) can be prepared by condensing a thionyl halide and a benzophenone. The sulfonyl derivative can be prepared by oxidation of either said sulfinyl bis(2-hydroxybenzophenone) or a thio bis(2-hydroxybenzophenone). These compounds are useful as ultraviolet stabilizers.

This invention relates to ultraviolet light stabilizers and to stabilized polymeric compositions containing same. More particularly, this invention relates to sulfinyl and sulfonyl linked bis(2-hydroxybenzophenone) UV stabilizers and to polymeric compositions containing same.

Unstabilized polymers, most notably olefin polymers such as polypropylene and vinyl polymers such as poly(vinyl chloride) become unstable after being exposed to ultraviolet light. Depending upon the polymer, exposure to ultraviolet light will cause the material to become colored and/or brittle to an undesirable degree. Increased embrittlement resulting from exposure to ultraviolet light commonly occurs with polyolefins. It is believed that the ultraviolet light catalyzes the formation of carbonyl groups in the polyolefin chain which results in the degradation thereof. Discoloration caused by exposure to ultraviolet light is a common problem with vinyl polymers and is believed to be caused by the ultraviolet light catalyzed formation of hydrogen chloride which results in discoloration of the polymer.

It is therefore desirable to improve the stability of polymers against the degradative effects of ultraviolet light without adversely affecting the physical and chemical characteristics thereof. Generally, this can be accomplished by incorporating into the polymer a material which absorbs ultraviolet light and is able to re-emit the light at non-destructive wave lengths. It is desirable that the UV absorbers employed in the polymer be capable of absorbing ultraviolet light and re-emitting it at wavelengths which do not catalyze the formation of degradable forms of the polymers. Furthermore, it is desirable that the UV absorber be compatible with and inert to the polymer so that it can be homogeneously blended therewith. In addition, the UV stabilizer should not absorb light in the visible range so that the resulting polymeric composition can retain its clarity.

It is therefore an object of this invention to provide UV stabilizers.

It is a further object of this invention to provide UV absorbers which are compatible with a wide variety of polymeric materials.

It is a still further object of the present invention to provide polymeric compositions containing the UV absorbers of this invention which exhibit stability against the degrading effect of UV light.

Further objects of this invention will be evident in view of the following detailed disclosure.

In accordance with the present invention, there are provided ultraviolet light stabilizers comprising sulfinyl or sulfonyl linked bis(2-hydroxybenzophenones) represented by the Formula I:

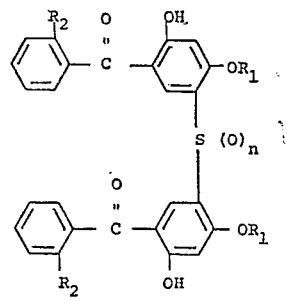

wherein $R_1$ is hydrogen or alkyl having from 1 to 8 carbon atoms (including cycloalkyl having from 3 to 7 carbon atoms) or aralkyl having from 7 to 18 carbon atoms especially monocyclic or bicyclic ar (lower-alkyl) such as benzyl, phenethyl, 1-naphthylmethyl and the like; $R_2$ is hydrogen or alkyl having from 1 to 8 carbon atoms; and $n$ is an integer from 1 to 2, inclusive.

The compounds of the present invention are colorless, heat and light stable materials which are soluble in and compatible with a wide variety of synthetic polymeric materials. Thus, in one aspect of the present invention there are provided stabilized polymeric compositions containing the UV absorbers of the present invention. The compounds of Formula I can be employed to stabilize any of a wide variety of polymeric materials including polyesters such as poly(ethyleneadipate); cellulosic derivatives such as cellulose acetate, cellulose propionate and cellulose acetate butyrate; polyolefins such as polyethylene and polypropylene; and vinyl polymers such as poly(vinyl chloride), polystyrene, poly(vinyl acetate), copolymers of vinyl chloride and vinylidene chloride and the like.

The sulfinyl bis(2-hydroxybenzophenones) of this invention can be prepared by condensing a thionylhalide and a benzophenone or mixture of benzophenones represented by the Formula II:

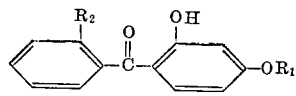

II wherein $R_1$ and $R_2$ are defined above. The sulfonyl bis(2-hydroxybenzophenones) of this invention can be prepared by oxidizing either said sulfinyl bis(2-hydroxybenzophenone) or a thio bis(2-hydroxybenzophenone) such as disclosed in U.S. Pat. 3,399,237.

Representative compounds of this invention are 5,5'-sulfinylbis(2-hydroxy-4-methoxybenzophenone),
5,5'-sulfinylbis(2-hydroxy-4-octyloxybenzophenone),
5,5'-sulfinylbis(2-hydroxy-4-cyclohexyloxybenzophenone),
5,5'-sulfinylbis(2-hydroxy-4-benzyloxybenzophenone),
5,5'-sulfonylbis(2-hydroxy-4-octyloxybenzophenone),
5,5'-sulfonylbis(2,4-dihydroxybenzophenone),
5,5'-sulfonylbis(2-hydroxy-4-methoxy-2'-methylbenzophenone),
5,5'-sulfonylbis(2-hydroxy-4-cyclopentyloxybenzophenone),
5,5'-sulfonylbis(2-hydroxy-4-benzyloxybenzophenone)
and the like.

The condensation reaction of a 2-hydroxybenzophenone and a thionyl halide is preferably conducted in a reaction medium either in the absence of a catalyst or in the presence of an acid catalyst. Illustrative of such acid catalysts are ferric chloride, ferrous chloride, stannic chloride, stannous chloride, aluminum chloride, titanium tetrachloride, aluminum bromide, gallium trichloride, cuprous chloride and the like.

The condensation reaction is carried out in an inert solvent by reacting one mole of the thionyl halide, preferably thionyl chloride with two moles of the benzophenone represented by Formula II. To effect substantially complete reaction, the thionyl halide is usually present in molar excess of from about 25 to almost 100 percent. Any solvent can be employed so long as it effectively dissolves the reactants and is not reactive with either the reactants or the product. Suitable solvents which can be employed include aromatic hydrocarbons such as benzene, toluene, nitrobenzene and the like. The reaction is carried out at a temperature to assure a relatively rapid rate of reaction without thermally degrading the reactants or the product. Reaction can be suitably effected at a temperature within the range of from almost 25° C. to about 100° C., preferably from about 25° C. to about 75° C. The product can be recovered from the reaction medium by conventional means such as by mixing an aqueous acid solution with the reaction medium to form an aqueous layer and an organic layer having the product dissolved therein. The product is recovered by isolating the organic layer and then mixing an aqueous caustic solution therewith to dissolve the product therein. The caustic aqueous layer is recovered and is then mixed with an acid to effect precipitation of the product. The product can then be recovered by filtration. The product can be purified by any means known in the art as, for example, by recrystallization.

The oxidation reaction to form sulfonyl bis(2-hydroxybenzophenone) compounds is conducted by heating a solution of either a sulfinyl bis(2-hydroxybenzophenone) represented by Formula I wherein $n$ is 1 or a thio bis(2-hydroxybenzophenone). The oxidation can be effected by mixing the reactant with a compound which releases free oxygen upon being heated such as hydrogen peroxide or the like or by bubbling a free-oxygen containing gas such as air through the heated reaction mixture. The reaction is effected by dissolving the reactant in an inert solvent such as glacial acetic acid, acetone, dimethylformamide or the like. The oxidizer is then added to the resultant solution in an amount to effect substantially complete conversion to the sulfonyl product. To effect reaction, the reaction medium is heated to a temperature of between about 25° C. and about 100° C., preferably between 25° C. and 75° C. for a period of between 2 and 8 hours. The reaction medium is then cooled to precipitate the sulfonyl product which is then separated from the liquid. The product can be purified in any known manner, as for example, by recrystallization.

The novel stabilizers of this invention can be incorporated into the polymeric substrate by any conventional blending techniques. Thus, the dry stabilizer in powder form can be mixed with a powdered or granular resin and the resultant mixture can be appropriately treated by molding or extrusion. In another procedure the stabilizer can be mixed with the plastic by milling on a standard plastic mill and then formed into the desired shape. Other well known methods which can be employed include admixing a suspension or emulsion of the plastic with an emulsion or suspension of the stabilizer and then removing the emulsifying or suspending medium to obtain the desired composition.

The amount of stabilizer used to stabilize against the degrading effect of UV light depends on the amount of exposure to which the plastic is subjected and the nature of the plastic to be protected. In general, the stabilizer is added in amounts of from about 0.01 to about 5% by weight of the plastic material, preferably in amounts between about 0.1 to about 4% by weight.

The polymeric compositions stabilized with the compounds of this invention can also contain secondary stabilizers to further improve the stability thereof. Heat stabilizers can be used to reduce degradation by the high temperatures required for milling, molding and compounding the polymeric material. The heat stabilizers which can be used for this purpose can be any of the conventionally available types. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaurate, dibutyl tin isooctyl thioglycollate); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates) and the like.

Suitable secondary stabilizers which can be employed include derivatives of thiopropionic acid such as dilaurylthiodipropionate, distearylthiodipropionate, ditridecylthiodipropionate and the like. Suitable organic phosphites which can be employed include tridecylphosphite, triethylphosphite, dioctylphospite, diphthalodecylphosphite, distearylphentaerythritoldisphosphite, trilauryltrithiophosphite and the like. Generally, these materials, if employed, are employed in concentrations of 0.1 to 1.0% based upon the weight of the polymeric material.

Other additives can be employed to modify the plastic compositions for the intended application. Among such additives are fillers, antistatic agents, pigments (including $TiO_2$), dyes, antioxidants, lubricants, plasticizers and the like.

The following examples illustrate the present invention and are not intended to limit the same.

EXAMPLE 1

5,5'-sulfinylbis(2-hydroxy-4-methoxybenzophenone)

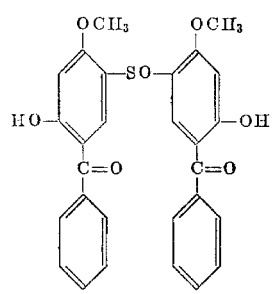

A reaction mixture containing 10 g. of 2-hydroxy-4-methoxybenzophenone, 15 g. of thionyl chloride and 8 g. of aluminum chloride in 40 ml. of nitrobenzene was allowed to stand at room temperature for 24 hours. The mixture was then poured into an aqueous hydrochloric acid bath. The nitrobenzene layer was separated from the mixture and extracted with an aqueous sodium hydroxide solution. The resultant solution was acidified to precipitate the product. The product was purified by being twice recrystallized from ethanol, M.P. 202–203° C.

EXAMPLE 2

5,5'-sulfonylbis(2-hydroxy-4-methoxybenzophenone)

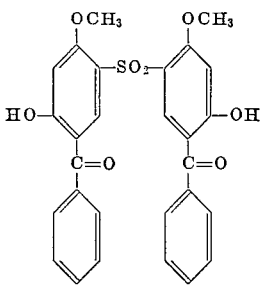

5,5'-thio bis(2-hydroxy-4-methoxybenzophenone) (5.4 g.) and 7 ml. of a 30% aqueous solution of hydrogen peroxide were dissolved in 300 ml. of glacial acetic acid. The solution was heated on a steam bath for four hours and cooled. The product was recovered by filtration and then recrystallized from glacial acetic acid, M.P. 264–267° C.

EXAMPLE 3

5,5'-sulfinylbis(2-hydroxy-4-octyloxybenzophenone)

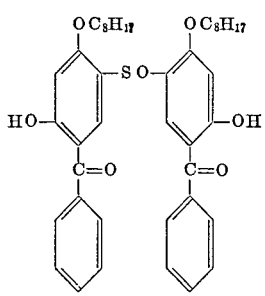

The procedure of Example 1 was followed except that 2-hydroxy-4-octyloxybenzophenone was employed as a reactant rather than 2-hydroxy-4-methoxybenzophenone. The product had a melting point of 131.5–132° C.

EXAMPLE 4

5,5'-sulfonylbis(2,4-dihydroxybenzophenone)

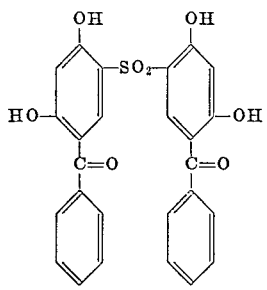

5,5'-thiobis(2,4-dihydroxybenzophenone) (6.0 g.) was dissolved in 800 ml. of glacial acetic acid. The resultant solution was mixed with 20 ml. of 30% hydrogen peroxide and then heated on a steam bath for 6 hours. The solution was then poured over ice to precipitate the product. The solid product was filtered and then purified by being recrystallized from ethanol, and then from benzene. The product had a melting point of 217–219° C.

EXAMPLE 5

5,5'-sulfonylbis(2-hydroxy-4-octyloxybenzophenone)

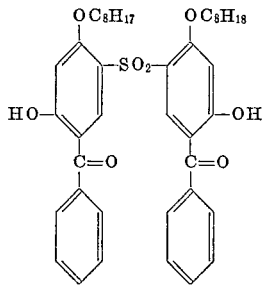

The procedure of Example 4 was repeated except that 5,5' - sulfinylbis(2-hydroxy-4-octyloxybenzophenone) was employed as a reactant rather than 5,5'-thiobis(2,4-dihydroxybenzophenone). The filtered product was purified by being recrystallized from heptane. The product had a melting point of 110–111° C.

EXAMPLE 6

5,5''-sulfonylbis(2-hydroxy-4-methoxy-2'-methylbenzophenone)

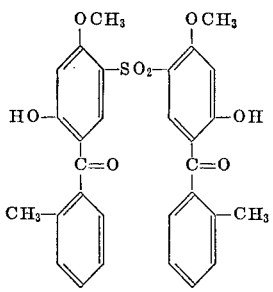

The procedure of Example 4 was repeated except that 5,5'-thiobis(2-hydroxy - 4 - methoxy-2'-methylbenzophenone) was employed as a reactant rather than 5,5'-thiobis(2,4-dihydroxybenzophenone). The product was purified by being recrystallized from a 1:1 benzene-ethanol mixture. The product had a melting point of 268–269° C.

EXAMPLE 7

Evaluation of stabilizers in rigid polyvinylchloride and vinyl chloride-vinyl acetate copolymer The stabilizers identified in Table I were incorporated in a rigid PVC homo polymer containing 2 weight percent of the heat stabilizer, dibutyl tin isooctyl thioglycollate, or in a copolymer comprising 90% vinyl chloride and 10% vinyl acetate. The additives were incorporated by conventional milling procedures and milled compositions were then compression molded into 50 mil plaques. The plaques were exposed to UV light using a Fluorescent Sunlamp-Blacklight (FS–BL) lamp, continuing the exposure until a change in Yellowness Index (Y.I.) of 15 units was reached and recording the elapsed time to obtain a charge in Yellowness Index of 15 units. The Yellowness Index is determined on a "Colormaster" differential colorimeter using the formula $$\text{Yellow Index} = 70 \left( \frac{\text{Blue}}{\text{Green}} \right)$$

in the manner disclosed in U.S. Pat. 3,079,366. The data in Table I show the effectiveness of the compounds of this invention in stabilizing polymeric materials against degradation caused by exposure to UV light.

The data in Table I show that each of the compounds of this invention when incorporated in either the PVC or the copolymer greatly improved the stability of the resultant polymeric composition against the discoloration caused by exposure to UV light.

TABLE I

| Additive | Wt. percent additive | | FS-BL, hrs. to ΔYI of 15 |
|---|---|---|---|
| 5,5'-sulfinylbis(2-hydroxy-4-methoxybenzophenone) | 0.2 | VC-VA copolymer | 431 |
| 5,5'-sulfinylbis(2-hydroxy-4-octyloxybenzophenone) | 0.2 | do | 950 |
| 5,5'-sulfonylbis(2-hydroxy-4-octyloxybenzophenone) | 0.5 | PVC | 395 |
| 5,5'-sulfonylbis(2,4-dihydroxybenzophenone) | 0.5 | PVC | 420 |
| 5,5'-sulfonylbis(2-hydroxy-4-methoxy-2'-methylbenzophenone) | 0.5 | PVC | 340 |
| Control, no additive | 0 | VC-VA copolymer | 164 |
| Do | 0 | PVC | 110 |

EXAMPLE 9

Evaluation of stabilizers in polypropylene

The compound 5,5'-sulfonylbis(2 - hydroxy - 4 - octyloxybenzophenone) was incorporated into unstabilized polypropylene by conventional milling at about 175–180° C. The resultant composition as well as a control sample containing no stabilizer were compression molded at 190° C. into 15 mil films. The films were then exposed in the FS–BL unit until embrittlement time was observed. The results obtained are shown in Table II.

TABLE II

| Additive | Wt. percent | FS-BL brittle point (hrs.) |
|---|---|---|
| None | 0 | 100 |
| 5,5'-sulfonylbis(2-hydroxy-4-octyloxybenzophenone) | 0.25 | 452 |

The data in Table II show that 5,5'-sulfonylbis(2-hydroxy - 4 - octyloxybenzophenone) provides substantially increased stability against embrittlement caused by exposure to UV light for polypropylene.

What is claimed is:

1. A composition of matter having the formula:

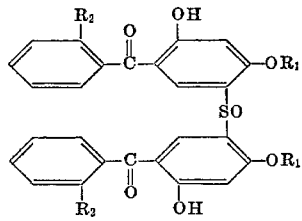

wherein $R_1$ is alkyl having from 1 to 8 carbon atoms, and $R_2$ is hydrogen.

2. 5,5'-sulfinylbis(2 - hydroxy - 4 - methoxybenzophenone).

3. 5,5'-sulfinylbis(2 - hydroxy - 4 - octyloxybenzophenone).

References Cited

UNITED STATES PATENTS

| | | | |
|---|---|---|---|
| 3,399,237 | 8/1968 | Dressler et al. | 260—591 |
| 3,272,869 | 9/1966 | O'Shea | 260—609 F |
| 3,238,263 | 3/1966 | Schetelich et al. | 260—609 F |
| 3,200,135 | 8/1965 | Cutler | 260—609 F |
| 2,717,832 | 8/1955 | Sulich, Jr. | 260—609 F |

DANIEL D. HORWITZ, Primary Examiner

U.S. Cl. X.R.

260—45.95